United States Patent
Brew et al.

[11] 4,165,247
[45] Aug. 21, 1979

[54] POLYURETHANE SOLID PROPELLANT BINDER

[75] Inventors: William R. Brew, New York, N.Y.; Raymond M. Price, Applegate, Calif.

[73] Assignee: The United States of America as represented by the Secretary of the Navy, Washington, D.C.

[21] Appl. No.: 526,663

[22] Filed: Feb. 9, 1966

[51] Int. Cl.$^2$ .............................................. C06B 45/10
[52] U.S. Cl. ................................. 149/19.4; 149/19.6; 149/20; 528/44; 528/73; 528/76
[58] Field of Search ....................... 149/19, 19.4, 19.6, 149/19.91, 20; 528/44, 73, 76

[56] References Cited

U.S. PATENT DOCUMENTS

| | | | |
|---|---|---|---|
| 3,291,660 | 12/1966 | Oberth et al. | 149/19.4 |
| 3,745,075 | 7/1973 | Muenker et al. | 149/19.4 |
| 3,870,578 | 3/1975 | Nichols | 149/19.4 |

*Primary Examiner*—Edward A. Miller

EXEMPLARY CLAIM

1. A composition capable of being cast and cured into a solid propellant comprising:
   (a) an organic compound having as its sole reacting groups two isocyanate groups, and
   (b) the hydroxy terminated condensation product of a compound having the structure

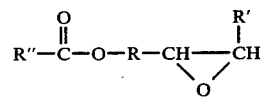

wherein
R is alkylene
R' is selected from the group consisting of hydrogen and alkyl
R'' is alkyl
and a compound having the structure

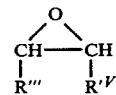

wherein R''' and R'$^v$ are selected from the group consisting of hydrogen and alkyl.

16 Claims, No Drawings

POLYURETHANE SOLID PROPELLANT BINDER

This invention pertains to solid propellants and more particularly to solid propellants of the composite type which contain a high energy plasticizer.

One type of solid propellant which has been used in rocket motors is the so-called composite type and it generally comprises a solid oxidizer dispersed in an organic resin. In some cases it would be desirable to increase the impulse characteristics of these propellants by the use of a high ratio of energetic acidic plasticizer to organic resin but heretofore the use of such ratios has affected the compatability of the propellant composition as evidenced by cure level, aging stability and plasticizer retention.

Accordingly, it is an object of this invention to provide a solid propellant of a composite type containing a high energy acidic plasticizer.

It is another object of this invention to provide a solid propellant which has a good plasticizer retention.

It is a further object of this invention to provide a solid propellant with good aging stability.

These and other objects will become more readily apparent from reading the following detailed description of the invention.

The objects of this invention are accomplished by providing a solid propellant of the composite type wherein one of the components of the resin binder has pendent ester groups. The invention will be more fully described in the light of the following background information.

The compatability of propellant and plasticizers was improved by the use of ester linkage in the polymeric component of the binder but such a use also resulted in chain scission at the cite of the ester linkage, said scission being caused by the acidic decomposition products liberated by the plasticizer in the presence of the solid oxidizer of the propellant. In order to obtain increased compatability and avoid significant decreases in chain length, if scission does occur, the ester grouping is held as a pendant group on the main polymer chain rather than as an integral part of the chain.

More particularly, the objects of this invention are accomplished by providing a solid propellant comprising about 45-95 weight percent of a solid oxidizer and from about 5 to 55 weight percent of a crosslinked polyurethane binder wherein the polyurethane is the reaction product of a hydroxy terminated polymer having a pendant ester group and an organic compound having as its sole reacting groups, two isocyanate groups. The term crosslinked polyurethane binder is used herein to include crosslinked polyurethane and any other conventional propellant ingredients e.g. plasticizers, antioxidents, wetting agents, polymerization catalysts, reinforcing agents, solid fuels, metal oxides, burning rate catalysts, resonance suppressors, etc. that may be present.

The polymeric component having pendant ester groups that is generally employed is formed by condensing epoxy compounds having following structures (a) and (b) in the presence of a convention condensation catalyst and terminating the resulting product in hydroxy groups.

wherein
R is alkylene
R' is either hydrogen or alkyl
R" is alkyl

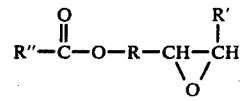

wherein R''' and R'ᵛ are either hydrogen or alkyl.

The products having a molecular weight between about 1350 and 2638 are preferred with the hydroxy terminated polymer produced by condensing ethylene oxide with glycidyl acetate giving especially good results. Since any one of a wide variety of conventional condensation reactions may be utilized in producing the above polymeric component, the details of such a reaction will not be set forth herein.

It is to be understood that the invention is not to be limited to the specific condensation products described above since the objects of this invention may be accomplished with other hydroxy terminated compounds so long as they have pendant ester groups. Thus, for example, a hydroxy terminated polymer having a hydrocarbon backbone may be acceptable in some systems. As an example of such a polymeric component there may be mentioned a polymer having the following structure:

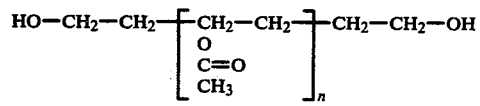

wherein (n) is an integer such that the polymer has a molecular weight between about 1350 and 2638.

A compound with the above structure may be prepared by hydrolyzing a low molecular weight polyvinyl acetate to a desired degree of hydroxyl functionality.

The polyurethane which forms the propellant binder is the reaction product of a polymeric component of the type described above, a diisocyanate and a crosslinking agent, with the diisocyanate being used in at least a stoichiometric amount (based on the active hydrogen functionality of the polymeric component and crosslinking agent), with an excess up to 25% being preferred. The ratio of polymeric component to crosslinking agent will vary depending upon the degree of cure desired, said ratio (based on equivalents) generally varying between about 1:1 and 9:1.

The diisocyanates used in the invention may be any one of a wide variety of organic diisocyanates which are generally used in forming polyurethanes, including saturated and unsaturated; aliphatic or aromatic; open or closed chain; and if the later, monocyclic or polycyclic; diisocyanates. The diisocyanates may or may not be substituted by groups that are substantially unreactive with isocyanate or hydroxyl groups, such as, for example, ketone, halogen, ester, sulfide, ether or nitro groups. Representative examples include:

(a) Substituted and unsubstituted alkane diisocyanates such as:
Ethylene diisocyanate;
Trimethylene diisocyanate;
Propylene-1,2-diisocyanate;
Tetramethylene diisocyanate;
Butylene-1,3-diisocyanate;
Decamethylene diisocyanate;
Octadecamethylene diisocyanate;
2-chloro-propane-1,3-diisocyanate
3,3-dinitro-pentane-1,5-diisocyanate; etc.

(b) Substituted and unsubstituted alkene diisocyanates such as:
1-propylene-1,2-diisocyanate;
2-propylene-1,2-diisocyanate;
1-butylene-1,2-diisocyanate;
3-butylene-1,2-diisocyanate;
1-butylene-1,3-diisocyanate;
1-butylene-2,3-diisocyanate; etc.

(c) Substituted and unsubstituted alkylidene diisocyanates such as:
Ethylidene diisocyanate;
Propylidene-1,1-diisocyanate;
propylidene-2,3-diisocyanate; etc.

(d) Substituted and unsubstituted cycloalkylene diisocyanates such as:
Cyclopentylene-1,3-diisocyanate;
Cyclohexylene-1,2-diisocyanate;
Cyclohexylene-1,3-diisocyanate;
Cyclohexylene-1,4-diisocyanate; etc.

(e) Substituted and unsubstituted cycloalkylidene diisocyanates such as:
Cyclopentylidene diisocyanates;
Cyclohexylidene diisocyanate; etc.

(f) Substituted and unsubstituted aromatic diisocyanates such as:
m-Phenylene diisocyanate;
o-Phenylene diisocyanate;
p-Phenylene diisocyanate;
1-methyl-2,4-phenylene diisocyanate;
Naphthylene-1,4-diisocyanate;
Diphenylene-4,4'-diisocyanate;
2,4-tolylene diisocyanate;
2,6-tolylene diisocyanate;
4,4'-diphenylmethane diisocyanate;
1,5-naphthalene diisocyanate;
Methylene-bis-(4-phenylisocyanate);
2,2-propylene-bis-(4-phenylisocyanate);
Xylene-1,4-diisocyanate;
Xylylene-1,3-diisocyanate;
4,4'-diphenylenemethane diisocyanate;
4,4'-diphenylenepropane diisocyanate;
diphenyl-3,3'-dimethoxy-4,4'-diisocyanate;
naphthalene-1,5-diisocyanate;
2,3-tolylene diisocyanate;
Chlorophenyl-2,4-diisocyanate;
diphenyl-3,3'-dichloro-4,4'-diisocyanate; etc.

(g) Substituted and unsubstituted diisocyanates containing hetero-atoms such as:
alkane ether diisocyanates, e.g.
$OCN-CH_2CH_2-O-CH_2CH_2-NCO$, etc.
pyridine diisocyanates, e.g.
2,3-pyridine diisocyanate, etc.
nitraza alkylene diisocyanates, e.g.
3-nitrazapentane-1,5-diisocyanate, etc.

The crosslinking agents which are used either singularly or in combination with each other in this invention are chosen from the wide variety of polyfunctional compounds currently used for crosslinking polyurethanes. The crosslinking agents utilized are preferably non-basic because if they are basic, there might be an interaction between the crosslinking agent and the acidic plasticizer. Compounds having as their sole reacting groups, three or more groups capable of reacting with isocyanate groups, e.g., groups containing active hydrogen, are particularly effective in this invention. It is to be understood that these compounds may also contain groups that are relatively unreactive with isocyanate or hydroxy groups such as, for example, ketone, halogen, ester, sulfide or ether groups and the term sole reacting groups is not meant to exclude these groups. Representative compounds include: saturated aliphatic and aromatic polyhydric alcohols, such as 1,2,3-propanetriol (glycerol), 1,2,6-hexanetriol, trimethylolpropane, erylthritol, pentaerylthritol, rabitol, xylitol, sorbitol, mannitol, trimethylolphenol, trimethylolbenzene, and the like; polyhydric amines, such as trimethylolamine, triethanolamine, triisopropanolamine, tri-n-propanolamine, N,N,N',N'-tetrakis(2-hydroxypropyl) ethylene diamine (Quadrol), N(2-hydroxyethyl)-N,N',N'-tris(2-hydroxypropyl) ethylene diamine, and the like; esters of polyhydric alcohols and fatty acids, such as castor oil, glyceryl mono-, di-, and triricinoleate, glyceryl mono-, di-, and tri(12-hydroxystearate), pentaerylthritol mono-, di-, tri-, and tetraricinoleate, pentaerylthritol mono-, di-, tri-, and tetra(12-hydroxystearate), 2,3-dihydroxypropyl-12-hydroxystearate, 2,3-dihydroxy ricinoleate, and the like, alkylene oxide adducts of polyhydric alcohols, such as ethylene oxide adducts of glycerol, 1,2,6-hexanetriol, and pentaerylthritol, propylene oxide adducts of glycerol (NIAX Triol LG Series), propylene oxide adducts of 1,2,6-hexanetriol, (NIAX Triol LHT Series), and the like; condensation products of 2 or more polyhydric alcohols, such as condensation products of 1,2,6-hexanetriol and glycerol, and the like, polyhydric derivatives of sugars, such as the octakis (2-hydroxypropyl) derivative of sucrose (Hyprose SP80), and like derivatives of glycose; and the like.

The high energy acidic plasticizers that may be used to improve the impulse characteristics of the propellant are well known in the art and from among these well known compounds there may be mentioned nitro compounds such as the bis (dinitroalkyl) acetals (e.g. the bis(dinitropropyl) acetal of formaldehyde, the bis (dinitropropyl) acetal of acetaldehyde, etc), etc.; nitrato compounds such as triethyleneglycol dinitrate, diethyleneglycol dinitrate, nitroglycerine, etc.; difluoroamino compounds such as hexakis (difluoroamino) propyl ether, tris (difluoroamino ethoxy) propane, etc.; and the like. Due to the use of a polymer having pendant basic ester groups as a component of the binder, higher plasticizer-organic resin ratios may be used e.g. good cures have been obtained with difluoroamino plasticizer to resin weight ratios of about 9:1 and nitro plasticizer to resin weight ratios of about 7:1.

It is generally desirable to also employ a polymerization catalyst of the type generally used in the polymerization of polyurethanes. As representative examples of these well-known catalysts there may be mentioned the organometals such as ferric acetylacetonate, dibutyl tin diacetate, titanyl acetylacetonate, vanadium acetylacetonate, vanadyl acetylacetonate, and the like.

The solid salts which are used either singularly or in combination with each other as the oxidizer in the propellant are employed in powdered form (average particle sizes usually range between 1 and 300 microns) and they representatively include the nitrates, perchlorates, chlorates, permanganates, chromates and dichromates of the alkali or alkaline earth metals; ammonia; hydrazine; or guanidine. As representative compounds there may be mentioned ammonium nitrate, ammonium perchlorate, sodium nitrate, potassium perchlorate, lithium chloride, calcium nitrate, barium perchlorate, strontium chlorate, and the like, with ammonium perchlorate being preferred.

The propellant also preferably includes a solid fuel component in powdered form (average particle size usually ranges from about 1 to 200 microns) and from among the well-known solid fuels there may be mentioned metals such as aluminum, boron, magnesium, beryllium, etc.; metal alloys such as the aluminum alloys of boron, magnesium, manganese, zinc, copper, etc.; metal hydrides such as the hydrides of aluminum, beryllium, etc.; and the like. These solid fuels are used in concentrations consistent with good mixing characteristics (usually between about 2 and 30 weight percent of the propellant composition).

The propellant composition may also include, as mentioned above, other conventional propellant ingredients such as antioxidants, e.g. BLE (reaction product of acetone and diphenylamine), etc.; wetting agents, e.g. Lecithin, etc.; metal oxides, e.g. magnesium oxide, etc.; reinforcing agents, e.g. lignin, etc.; burning rate catalysts, e.g. copper chromite, etc.; resonance suppressors, e.g. carbon black, etc.; and the like. These additives generally do not comprise more than about 10% of the propellant composition.

It is to be understood that the above mentioned specific examples of diisocyanates, crosslinking agents, solid oxidizers, solid fuels, etc., are only representative examples of the wide variety of these components which may be utilized in this invention and they are not to be construed as limiting the invention in any manner.

The propellant is generally prepared by first heating and blending all ingredients, except the diisocyanate and solid components (oxidizer, fuel, etc.), under vacuum for a short period of time, e.g. 10 minutes. Subsequently, the solid component is blended into the mixture with heating under vacuum, followed by the addition of the diisocyanate. The resulting mixture is cast and cured (generally between about 60° and 200° F.) into a solid propellant comprising a solid component dispersed in a polyurethane fuel binder. Alternatively, the propellant mixture can be cast and cured directly in a rocket chamber lined with an inert liner material.

The following examples are illustrative of the invention but its scope is not to be limited thereby.

EXAMPLE I

The following composition may be used in forming a solid propellant;

| Components | Wt % |
| --- | --- |
| Toluene diisocyanate | 1.179 |
| Hydroxy terminated condensation product of glycidal acetate and ethylene oxide (M.W. 1800) | 5.545 |
| 1,1,1-Trimethylol propane | 0.276 |
| Tris(difluoroamino ethoxy) propane | 28.000 |
| Ammonium perchlorate | 50.000 |
| Aluminum | 15.000 |
| Dibutyl tin dilaurate | 0.125 |

The propellant may be prepared by first mixing the polymeric diol with the trimethylolpropane for 30 minutes at about 70° C. Subsequently the tri (difluoroaminoethoxy) propane is added with mixing under vacuum for five minutes, followed by the addition of toluene diisocyanate with mixing for five minutes and the addition of dibutyl tin dilaurate with mixing for an additional five minutes. The solid aluminum is added with mixing under vacuum for about five minutes followed by the addition of ammonium perchlorate with mixing for fifteen minutes under vacuum. The composition may then be cast and cured in from about 24 to 48 hours at 27° C.

EXAMPLE II

The following composition may be used in preparing a solid propellant:

| Components | Wt % |
| --- | --- |
| Toluene diisocyanate | 1.079 |
| Hydroxy terminated condensation product of glycidal acetate and ethylene oxide (M.W. 1800) | 7.813 |
| Trimethylol propane | 0.166 |
| Nitroglycerine | 23.442 |
| Beryllium hydride | 21.500 |
| Ammonium perchlorate | 46.000 |
| Magnesium oxide | 0.100 |
| Ferric acetylacetonate | 0.023 |

The mixing, casting and curing may be accomplished similarly to Example I.

EXAMPLE III

The following composition may be used in forming a solid propellant:

| Components | Wt % |
| --- | --- |
| 1,6-Hexane diisocyanate | 0.414 |
| Hydroxy terminated condensation product of glycidal acetate and ethylene oxide (M.W. 1800) | 2.440 |
| Trimethylol propane | 0.036 |
| Mixture of bis (dinitropropyl) acetal of formaldehyde and bis (dinitropropyl) acetal of acetaldehyde | 19.125 |
| Ammonium perchlorate | 50.50 |
| AlH$_3$ | 27.00 |
| Tween 21 (wetting agent) | 0.320 |
| MOL. Sieve (drying agent) | 0.162 |
| Ferric acetylacetonate | 0.003 |

The mixing procedure is similar to the one of Example I and the curing may be accomplished in about five days at about 5° C.

The solid propellants produced by this invention possess improved cure level, aging stability, and plasticizer retention over previous solid propellants that contained high energy acidic plasticizers. The solid propellants of this invention, due to the use of higher plasticizer to organic resin ratios, also have improved impulse characteristics and will be used in a wide variety of rockets.

Obviously many modifications and variations of the present invention are possible in the light of the above teachings. It is therefore to be understood, that within the scope of the appended claims, the invention may be practiced otherwise than as specifically described.

What is claimed is:

1. A composition capable of being cast and cured into a solid propellant comprising:
   (a) an organic compound having as its sole reacting groups two isocyanate groups, and
   (b) the hydroxy terminated condensation product of a compound having the structure

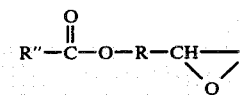

wherein
R is alkylene
R' is selected from the group consisting of hydrogen and alkyl
R" is alkyl
and a compound having the structure

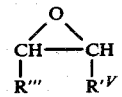

wherein R''' and R'$^v$ are selected from the group consisting of hydrogen and alkyl.

2. The composition of claim 1 wherein the organic compound is an organic diisocyanate selected from the group consisting of substituted and unsubstituted alkane, alkene, alkylidene, cycloalkylene, cycloalkylidene, aromatic, alkane ether, pyridine and nitrazaalkylene diisocyanates.

3. The composition of claim 1 wherein member (b) is the hydroxy terminated condensation product of glycidal acetate and ethylene oxide.

4. The composition of claim 3 wherein the organic compound is toluene-2,4-diisocyanate.

5. The composition of claim 3 wherein the organic compound is 3-nitrazapentane-1,5-diisocyanate.

6. The composition of claim 3 wherein the organic compound is 1,6-hexane diisocyanate.

7. The composition of claim 3 further including a solid fuel.

8. The composition of claim 2 wherein the high energy acidic plasticizer is selected from the group consisting of nitrato, nitro, and difluoroamino plasticizers.

9. A solid propellant of the composite type comprising from about 45 to 95 weight percent of a solid oxidizer and from about 5 to 55 weight percent of a crosslinked polyurethane binder, said bonder including a high energy acidic plasticizer and said polyurethane being the reaction product of an organic compound having as its sole reacting groups two isocyanate groups and a hydroxy terminated condensation product of a compound having the structure

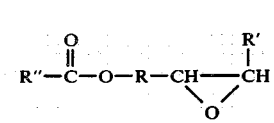

wherein
R is alkylene
R' is selected from the group consisting of hydrogen and alkyl
R" is alkyl
and a compound having the structure

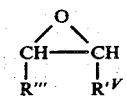

wherein R''' and R'$^v$ are selected from the group consisting of hydrogen and alkyl.

10. The propellant of claim 9 wherein the organic compound is an organic diisocyanate selected from the group consisting of substituted and unsubstituted alkane, alkene, alkylidene, cycloalkylene, cycloalkylidene, aromatic, alkane ether, pyridine and nitrazaalkylene diisocyanates.

11. The propellant of claim 9 wherein said member is the hydroxy terminated condensation product of glycidal acetate and ethylene oxide.

12. The propellant of claim 11 wherein the organic compound is toluene-2,4-diisocyanate.

13. The propellant of claim 11 wherein the organic compound is 3-nitrazapentane-1,5-diisocyanate.

14. The propellant of claim 11 wherein the organic compound is 1,6-hexane diisocyanate.

15. The propellant of claim 11 wherein the binder contains a solid fuel.

16. The propellant of claim 10 wherein the high energy acidic plasticizer is selected from the group consisting of nitrato, nitro and difluoroamino plasticizers.

* * * * *